(12) United States Patent
Farrell et al.

(10) Patent No.: US 10,953,481 B2
(45) Date of Patent: Mar. 23, 2021

(54) MACHINING/BURNISHING DUAL GEOMETRY ORBITAL DRILLING TOOL

(71) Applicant: The Boeing Company, Chicago, IL (US)

(72) Inventors: Nicholas Ryan Farrell, Long Beach, CA (US); Branko Sarh, Huntington Beach, CA (US); Michael L. Caldarera, La Palma, CA (US); Gary Lipczynski, Garden Grove, CA (US); Wesley Edward Holleman, Long Beach, CA (US); James Darryl Gamboa, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 578 days.

(21) Appl. No.: 15/068,636

(22) Filed: Mar. 13, 2016

(65) Prior Publication Data

US 2017/0259355 A1 Sep. 14, 2017

(51) Int. Cl.
*B24B 39/02* (2006.01)
*B24B 39/00* (2006.01)
(Continued)

(52) U.S. Cl.
CPC .............. *B23C 5/16* (2013.01); *B23B 51/08* (2013.01); *B23C 5/10* (2013.01); *B24B 39/00* (2013.01);
(Continued)

(58) Field of Classification Search
CPC ........ B23C 5/16; B23C 5/10; B23C 2220/605; B23C 2220/52; B23C 2215/04;
(Continued)

(56) References Cited

U.S. PATENT DOCUMENTS 1,948,057 A    2/1934  Tscherne
4,274,771 A *  6/1981  Nishimura .............. B23B 51/08
                                                  407/53
(Continued)

FOREIGN PATENT DOCUMENTS

CN        2283538 Y      6/1998
CN     101372093 A       2/2009
(Continued)

OTHER PUBLICATIONS

Netherlands Enterprise Agency, Search Report and Written Opinion in Netherlands' Patent Application No. 2016502, dated Feb. 21, 2017, 10 pages.
(Continued)

*Primary Examiner* — Rick K Chang
(74) *Attorney, Agent, or Firm* — Kolisch Hartwell, P.C.

(57) ABSTRACT

A combination cutting and burnishing orbital drilling tool may include an elongate tool body including a cutting end and extending along a longitudinal axis. The tool body may include a burnishing portion spaced from the cutting end and configured to induce residual stress in a side wall of a hole without removing material. The tool body may further include a cutting portion interposed between the cutting end and the burnishing portion. The cutting portion may be configured to remove material from a workpiece, thereby creating the hole, during an orbital drilling process.

20 Claims, 11 Drawing Sheets

(51) Int. Cl.
  *B23C 5/16* (2006.01)
  *B23B 51/08* (2006.01)
  *B23C 5/10* (2006.01)

(52) U.S. Cl.
  CPC ........ *B24B 39/02* (2013.01); *B23B 2220/445* (2013.01); *B23B 2270/26* (2013.01); *B23C 2215/04* (2013.01); *B23C 2220/52* (2013.01); *B23C 2220/605* (2013.01)

(58) Field of Classification Search
  CPC ................ B23B 51/08; B23B 2270/26; B23B 2220/445; B24B 39/02
  See application file for complete search history.

(56) References Cited

U.S. PATENT DOCUMENTS

| | | | |
|---|---|---|---|
| 4,573,838 | A | 3/1986 | Omi et al. |
| 4,963,059 | A | 10/1990 | Hiyama |
| 5,071,294 | A | 12/1991 | Suzuki et al. |
| 6,773,211 | B2 | 8/2004 | Zackrisson et al. |
| 6,997,651 | B2 | 2/2006 | Kawai et al. |
| 7,367,754 | B1 | 5/2008 | Greenwood et al. |
| 7,431,538 | B1 | 10/2008 | Ni et al. |
| 7,627,940 | B2 | 12/2009 | Amirehteshami et al. |
| 7,905,687 | B2 | 3/2011 | Dufour et al. |
| 7,959,382 | B2 | 6/2011 | Volokh et al. |
| 8,602,698 | B2 | 12/2013 | Craig et al. |
| 8,714,890 | B2 | 5/2014 | Davancens et al. |
| 8,858,129 | B2 | 10/2014 | Craig |
| 8,926,236 | B2 | 1/2015 | Kauper et al. |
| 2004/0057803 | A1 | 3/2004 | Walrath |
| 2004/0120777 | A1 | 6/2004 | Noland |
| 2006/0188346 | A1 | 8/2006 | Greenwood et al. |
| 2008/0047320 | A1 | 2/2008 | Christ et al. |
| 2012/0051863 | A1 | 3/2012 | Craig et al. |
| 2015/0020649 | A1 | 1/2015 | Sampath |

FOREIGN PATENT DOCUMENTS

| | | |
|---|---|---|
| CN | 201720556 U | 1/2011 |
| CN | 202914123 U | 5/2013 |
| CN | 203448723 U | 2/2014 |
| CN | 104827105 A | 8/2015 |
| DE | 1177904 B | 9/1964 |
| DE | 29715192 U1 | 12/1997 |

OTHER PUBLICATIONS

Ginger Gardiner, Orbital Drilling enables "one-up assembly", CompositeWorld E-Newsletter, URL: http://www.compositesworld.com/articles/orbital-drilling-enables-one-up-assembly, Sep. 2012, 8 pages.
WIDIA, Solid End Milling Catalogue, URL: http://www.widia.com/content/dam/kennametal/widia/common/resources/downloads/literature/WIDIA%20Catalogs/WIDIA%20Advances%202012%20Catalog/WIDIA%20Advances%202012%20Catalog%20-%20INCH%20-%20Sections%20to%20download/A-10-02470_Advances2012_C1-C5_SolidEndmills_minch.pdf, 2012, 6 pages.
WIDIA, Solid End Milling VariMill™ Mini Catalogue, URL: http://www.itc-ltd.co.uk/images/catalogues/WIDIA_VariMill_WEB_2014.pdf, © 2013, 44 pages.
U.S. Appl. No. 14/987,839, filed Jan. 5, 2016, which is another application of applicant The Boeing Company.
U.S. Patent and Trademark Office, Office action in U.S. Appl. No. 14/678,895, dated Oct. 26, 2017, 7 pages.
U.S. Patent and Trademark Office, Office action in U.S. Appl. No. 14/678,895, dated Apr. 14, 2017, 16 pages.
National Intellectual Property Administration, PRC, Notification of First Office Action and Search Report regarding Chinese Patent Application No. 201710065254.5, dated Oct. 29, 2019, 27 pages.
National Intellectual Property Administration of P.R.C., Notification of Second Office Action and Search Report regarding Chinese Patent Application No. 201710065254.5, dated Jul. 21, 2020, 16 pages.

* cited by examiner

MACHINING/BURNISHING DUAL GEOMETRY ORBITAL DRILLING TOOL

FIELD

This disclosure generally relates to drilling holes in objects. More specifically, the disclosed embodiments relate to apparatus and methods for machining a hole in a material using an orbital drilling tool and then burnishing the interior of the hole using the same tool.

INTRODUCTION

Building an aircraft may involve drilling hundreds if not thousands of holes in various parts made of a variety of materials. The quality of these holes and the efficiency with which they are drilled can have a dramatic effect on the time required to assemble the aircraft and the durability of the aircraft after it has been constructed. Many factors influence the quality and efficiency of the holes, including how long it takes to create an individual hole, how much clean-up is required after the hole is created, how repeatable the process is, how long the drilling tool(s) last, and how long the part lasts after drilling.

Orbital drilling has been shown to be an efficient method for creating high-quality holes in a variety of materials, including single-component materials and stack-ups of different materials. In conventional drilling a drill bit or cutting tool is pushed through a material as the tool spins on its own longitudinal axis. Thus, a hole created with conventional drilling will have the same diameter as the drill bit that created it. In contrast, in orbital drilling the drill bit or cutting tool rotates on its own longitudinal axis while at the same time that longitudinal axis rotates or "orbits" around the center of the hole being created in addition to being fed through a material. Thus, a hole created with orbital drilling may have a larger diameter than the drill bit that created it.

Orbital drilling has numerous advantages over conventional drilling, including less clean-up, the ability to make holes with a range of diameters using the same tool, generation of smaller chips and less heat, the ability to drill through a variety of different materials and stacks of materials, and longer tool life.

Another method for creating a hole in a part is a two-step process where, first, a pilot hole is created through a drilling process and, second, the diameter of the pilot hole is increased by removing material in a subsequent reaming process. In certain materials, such as aluminum, the fatigue performance of a hole may be improved with a drilling/reaming process as compared to an orbital drilling process. That is, the part itself may last longer if the hole is created via drilling and reaming. This performance benefit may be due to residual stress induced by the reaming process, where standard orbital drilling would leave a hole in aluminum in a neutral state of stress. In other materials, such as titanium and stainless steel, the fatigue performance of a hole may be substantially the same for both orbital drilling and drilling/reaming of the hole.

Drilling and then reaming may require two separate tools and reaming may produce burrs which then need to be removed, both of which would decrease efficiency relative to orbital drilling. Presently, creating a hole in aluminum may require weighing the efficiency benefits of orbital drilling against the performance benefits of drilling and reaming.

SUMMARY

In some embodiments, a combination cutting and burnishing orbital drilling tool includes an elongate tool body including a cutting end and extending along a longitudinal axis. The tool body includes a burnishing portion spaced from the cutting end and configured to induce residual stress in a side wall of a hole without removing material. The tool body further includes a cutting portion interposed between the cutting end and the burnishing portion. The cutting portion is configured to remove material from a workpiece, thereby creating the hole, during an orbital drilling process.

In some embodiments, a cutting tool has a body and includes a machining portion having a plurality of machining diameters beginning with a first machining diameter proximate a machining end of the tool. Each subsequent machining diameter is greater than the previous machining diameter. The tool further includes a burnishing portion having a burnishing diameter greater than the maximum of the plurality of machining diameters.

In some embodiments, a method of producing a hole in a workpiece includes rotating a tool having a cutting end and extending along a longitudinal axis. The tool has a burnishing portion spaced from the cutting end and a cutting portion interposed between the cutting end and the burnishing portion. The method includes moving the rotating tool in an orbital fashion into a workpiece, wherein the longitudinal axis of the tool moves around an along a hole axis, thereby creating a hole having side walls and extending along the hole axis into the workpiece. The method includes moving the burnishing portion of the rotating tool along and in contact with the side walls of the created hole in a manner inducing residual stress in the side walls of the hole.

The present disclosure provides various apparatuses and methods of use thereof. In some embodiments an apparatus may include a cutting tool body having a cutting portion and a burnishing portion. In some embodiments, the cutting portion may be configured to create a hole during an orbital drilling process and the burnishing portion may be configured to induce residual stress in a side wall of the created hole without removing material. Features, functions, and advantages may be achieved independently in various embodiments of the present disclosure, or may be combined in yet other embodiments, further details of which can be seen with reference to the following description and drawings.

DETAILED DESCRIPTION

Overview

Various embodiments of a combination cutting and burnishing orbital drilling tool having a cutting portion and a burnishing portion are described below and illustrated in the associated drawings. Unless otherwise specified, a combination cutting and burnishing orbital drilling tool and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other orbital drilling tools. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary combination cutting and burnishing orbital drilling tools as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes an illustrative combination cutting and burnishing orbital drilling tool. The combination cutting and burnishing orbital drilling tool is also referred to as a cutting tool, see FIG. 1.

Figure 1:
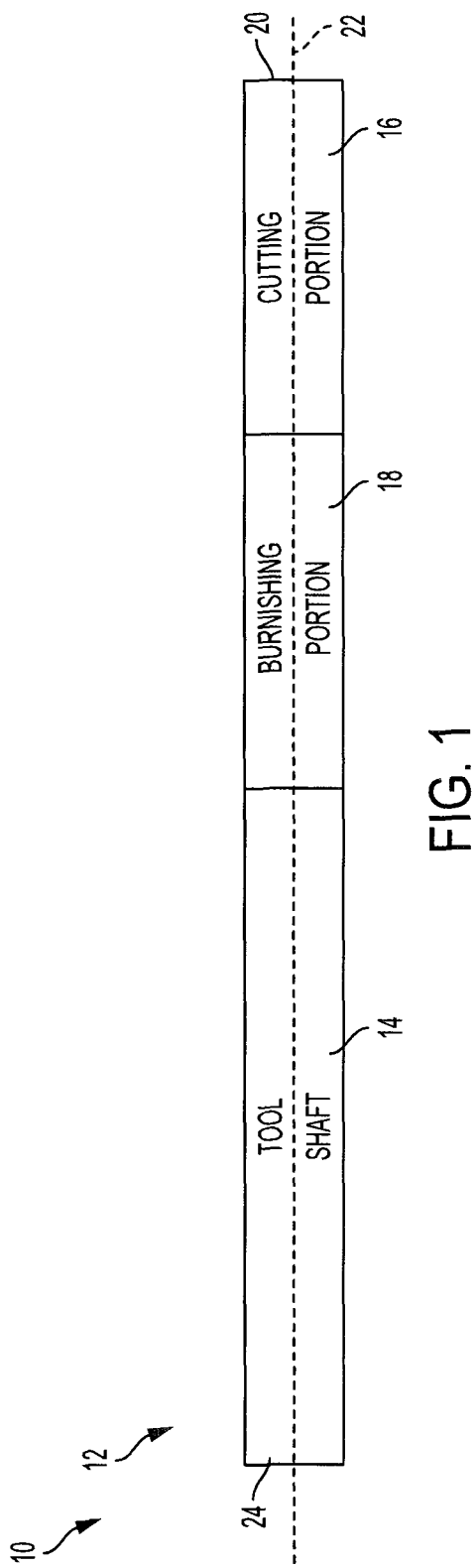
FIG. 1 is a schematic illustration of a combination cutting and burnishing orbital drilling tool.

FIG. 1 is a schematic illustration of a combination cutting and burnishing orbital drilling tool, generally indicated at 10. In this example, the cutting tool 10 has an elongate tool body 12 including a tool shaft 14, a cutting or machining portion 16, and a burnishing portion 18. The tool body 12 includes a cutting or machining end 20 and extends along a longitudinal axis 22. The burnishing portion 18 is spaced from the cutting end 20, and the cutting portion 16 is interposed between the cutting end 20 and the burnishing portion 18.

The tool shaft 14 may extend from the burnishing portion 18 to a drill end 24. Alternately, the burnishing portion 18 of the cutting tool 10 may be an extension of the tool shaft 14 where burnishing elements extend from the tool shaft 14 in a radial direction away from the longitudinal axis 22. The drill end 24 may be configured to be coupled to an orbital drill. There are several ways to couple a cutting tool 10 to a drill, any of which may be appropriate.

Cutting portion 16 may be configured to remove material from a workpiece or part, thereby creating a hole in the workpiece, during an orbital drilling process. As is discussed in further detail below, in an orbital drilling process the tool body 12 may spin on the longitudinal axis 22, while at the same time the longitudinal axis 22 may rotate around a hole axis spaced from and parallel to the longitudinal axis 22. The tool body 12 may advance through the workpiece as the tool body 12 is spinning and rotating.

The cutting portion 16 may include a plurality of cutting edges configured to remove material from the workpiece as the cutting tool 10 advances through the workpiece. The cutting edges may be disposed on the cutting end 20 and may extend along the longitudinal axis 22. The cutting portion 16 may include flutes, channels, or passageways so material that has been removed from the workpiece may be drawn away from the cutting edges. The cutting portion 16 may include passages for the introduction and removal of coolant or lubricant proximate the cutting edges.

The burnishing portion 18 may be configured to induce a residual stress in a side wall of a hole without removing material. The burnishing portion 18 induces a residual stress by deforming the side walls of the hole without removing material from the work piece. The burnishing portion 18 may, by non-limiting example, deform the side walls by running a rounded, conical, tapered or otherwise blunt edge against the work piece with sufficient force to exceed the work piece's yield strength. As the combination cutting and burnishing orbital drilling tool 10 proceeds through a workpiece, beginning with the cutting end 20, the cutting portion 16 of the cutting tool 10 may create a hole in the workpiece. As the cutting tool 10 continues to advance through the workpiece, the burnishing portion 18 may burnish or otherwise deform the side walls of the hole created by the cutting portion 16. In the case where the workpiece has a thickness that is greater than a longitudinal extent of the cutting portion 16, the cutting portion 16 may be creating deeper portions of a hole while the burnishing portion 18 is simultaneously burnishing the sides of shallower portions of the same hole.

Burnishing the side walls of the hole may deform the material of the workpiece proximate the side walls. The side walls of the hole may be smoothed out by the burnishing portion 18. The diameter of the hole may be slightly increased by contact with the burnishing portion 18, even as the burnishing portion 18 does not remove material from the workpiece. Burnishing is thus contrasted with reaming, where reaming increases the diameter of a hole by further removing material from the side walls of the hole. Causing deformations in the side walls of the hole may induce a beneficial residual stress in the side walls. In some cases, for example when the workpiece is made of aluminum, creating the hole with the cutting portion 16 may leave the side walls of the hole in a neutral state of stress which may be more prone to the formation of cracks over time. Burnishing the side walls of a hole formed in an aluminum workpiece may make the workpiece less susceptible to the formation of cracks and other defects.

Example 2

This example describes another illustrative combination cutting and burnishing orbital drilling tool. The combination cutting and burnishing orbital drilling tool may be referred to as a cutting tool, see FIGS. 2-3.

Figure 2:
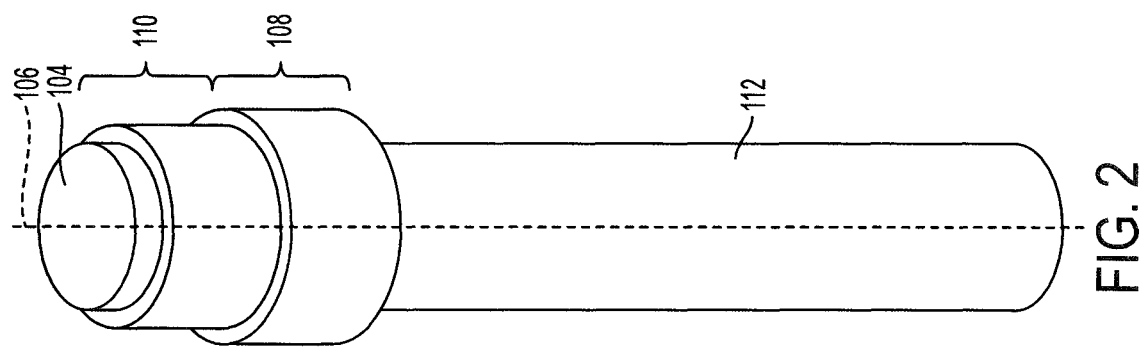
FIG. 2 is a schematic isometric view of another combination cutting and burnishing orbital drilling tool.
Figure 3:
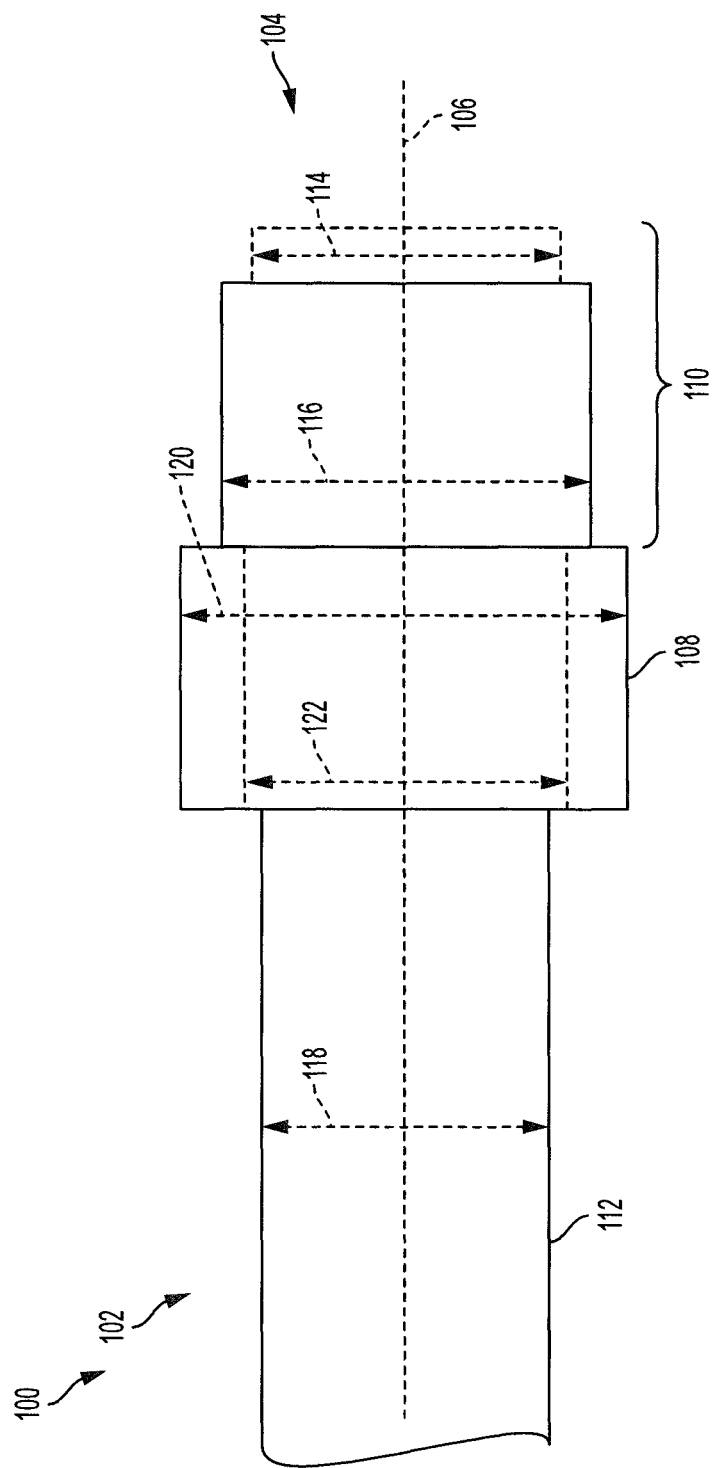
FIG. 3 is a schematic side view of the tool of FIG. 2.

FIG. 2 is a schematic perspective view of a combination cutting and burnishing orbital drilling tool, generally indicated at 100. FIG. 3 is a schematic side view of the cutting tool 100. FIGS. 2 and 3 are described below together. Cutting tool 100 may be similar to cutting tool 10, and the discussion of the benefits and methods of use of cutting tool 10 will not be repeated in their entirety.

In this example, the combination cutting and burnishing orbital drilling tool 100 has an elongate tool body 102 including a cutting or machining end 104 and extends along a longitudinal axis 106. The tool body 102 includes a burnishing portion 108 spaced from the cutting end 104 and a cutting or machining portion 110 interposed between the cutting end 104 and the burnishing portion 108. The tool body 102 further includes a tool shaft 112 disposed along the longitudinal axis 106 with the burnishing portion 108 interposed between the tool shaft 112 and the cutting portion 110.

The cutting portion 110, also referred to as the machining portion, includes a plurality of cutting or machining diameters, denoted by the number N, beginning with a first cutting or machining diameter 114 proximate the cutting or machining end 104. Each subsequent cutting diameter is greater than the previous cutting diameter. For example cutting tool 100 schematically depicted in FIGS. 2 and 3 may have an Nth cutting or machining diameter 116 and the Nth cutting diameter 116 may be greater than the first cutting diameter 114. Cutting tool 100 has two cutting diameters, 114 and 116, but any number of cutting diameters may be appropriate. That is, the number N may be any appropriate number including 1, 2, or numbers greater than 2. Each subsequent cutting diameter may be greater than the adjacent previous cutting diameter and may be disposed farther from the cutting end 104 than the adjacent previous cutting diameter. In other words, the cutting diameters may increase progressively from the cutting end 104.

In some embodiments, the cutting portion 110 may include only one cutting diameter. That is, the first cutting diameter 114 in cutting tool 100 may be optional so that the Nth cutting diameter 116 is the only cutting diameter of the cutting portion.

Tool shaft 112 may have a shaft diameter 118 and the burnishing portion 108 may have a burnishing diameter 120 that is greater than the shaft diameter 112. Having the burnishing diameter greater than the shaft diameter may allow the longitudinal axis 106 of the cutting tool 100 to be tilted with respect to an axis of a hole, while the burnishing portion of the cutting tool 100 is in contact with the side walls of the hole, without the tool shaft also making contact with the side walls of the hole.

The cutting portion 110 of the cutting tool 100 may have a maximum cutting diameter, for example the Nth cutting diameter 116. The burnishing diameter 120 is greater than the maximum cutting diameter. The difference between the burnishing diameter 120 and the maximum cutting diameter may be slight. For example, in some embodiments, the burnishing diameter may be greater than the Nth cutting diameter 116 by as little as one thousandth of an inch or less. Creating a cutting tool with such fine specifications may require precision manufacturing.

In some embodiments, the burnishing diameter may be less than the maximum cutting diameter 116. An example of an optional, smaller, burnishing diameter is indicated at 122 in FIG. 3. The optional burnishing diameter 122 may be greater than the shaft diameter 118.

In the discussion of FIGS. 2 and 3, any of the various diameters 114, 116, 118, 120, and 122 may be equivalently described in terms of an appropriate radius as measured from the longitudinal axis 106.

Example 3

This example describes an illustrative embodiment of a combination cutting and burnishing orbital drilling tool. The combination cutting and burnishing orbital drilling tool may be referred to as a cutting tool, see FIG. 4.

Figure 4:
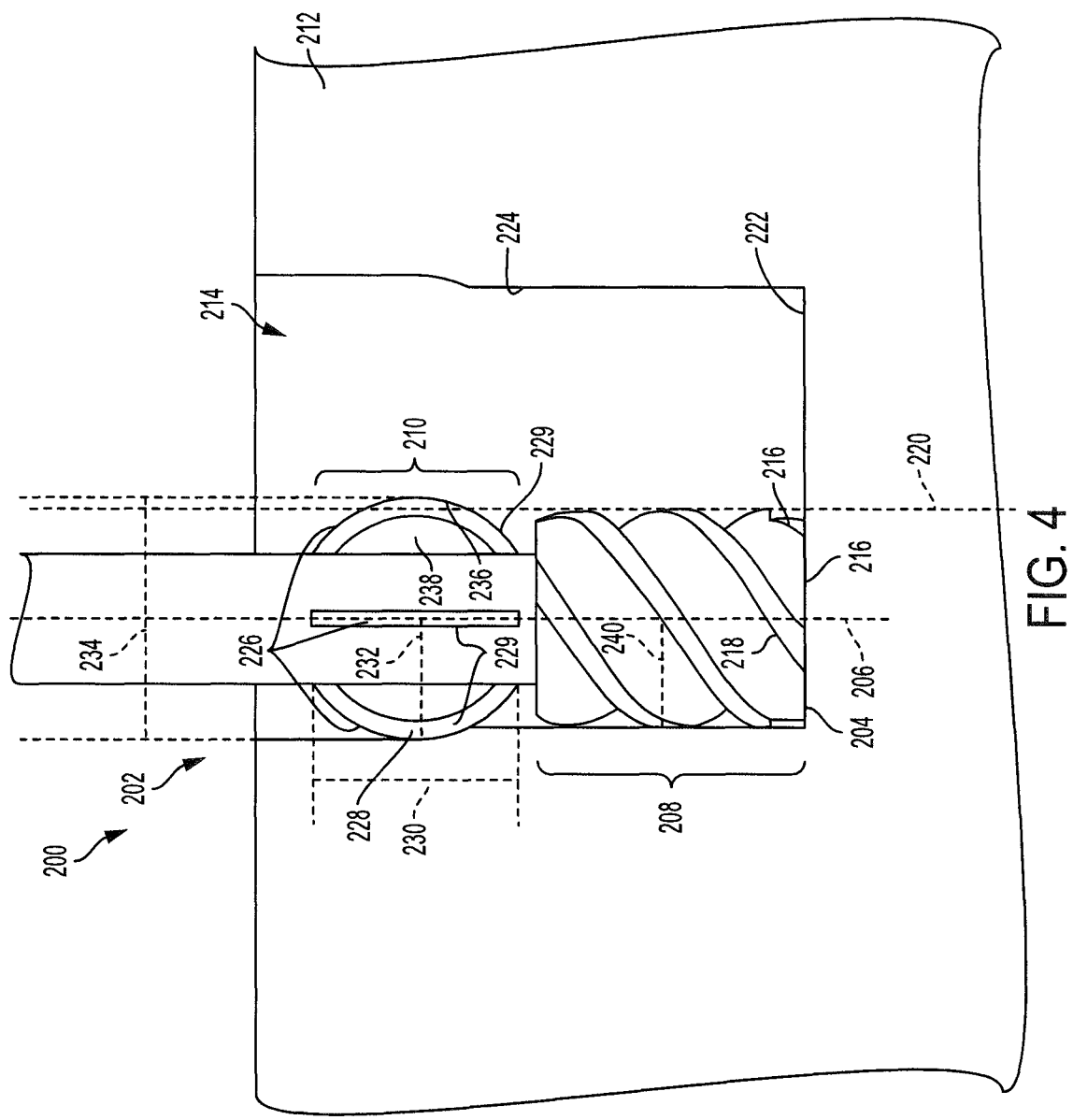
FIG. 4 is a side view depicting an embodiment of a combination cutting and burnishing orbital drilling tool, shown during a cutting process.

FIG. 4 is a side view depicting an embodiment of a combination cutting and burnishing orbital drilling tool, generally indicated at 200, shown during a cutting process. Cutting tool 200 may be similar to cutting tool 100 or cutting tool 10.

Cutting tool 200 may include an elongate tool body 202 having a cutting end 204 and extending along a longitudinal axis 206. The tool body may include a cutting or machining portion 208 and a burnishing portion 210. The burnishing portion 210 may be spaced from the cutting end and the cutting or machining portion 208 may be interposed between the cutting end and the burnishing portion.

The cutting portion 208 of the combination cutting and burnishing orbital drilling tool 200 may be configured to remove material from a workpiece 212, thereby creating a hole 214. The cutting portion may include at least one cutting edge 216 disposed on the tool body 202. A cutting edge 216 may extend along the cutting end 204 and extend from the cutting end along the longitudinal axis 206 in a cutting helix 218.

The cutting edge 216 may remove material from the workpiece 212 by making contact with the workpiece at the cutting end 204 or at the cutting helix 218 as the cutting tool 200 rotates about its own longitudinal axis 206 and orbits around a hole axis 220. A portion of the cutting edge disposed at the cutting end may create a floor 222 of the hole 214, while a portion of the cutting edge disposed at the cutting helix 218 may create a side wall 224 of the hole. As the cutting tool moves through the workpiece, the floor 222 of the hole may move deeper into the hole. If the cutting end travels completely through the workpiece the hole becomes a passage through the workpiece and the hole does not have a floor.

The burnishing portion 210 may include a plurality of burnishing elements 226 extending longitudinally along the tool body 202. Each of the plurality of burnishing elements may have a blunt radial outer surface 228 disposed for contacting the workpiece repeatedly during rotation of the drilling tool. That is, the blunt radial outer surface 228 may be a curved convex surface as viewed in a plane parallel to the longitudinal axis 206, as shown in FIG. 4.

In the embodiment shown in FIG. 4, the plurality of burnishing elements 226 includes a plurality of planar fins 229 extending radially from the tool body in planes containing longitudinal axis 206, as shown. The fins 229 may have a length 230 extending along the longitudinal axis 206 and the fins may be distributed circumferentially around the tool body. Each of the fins may extend to a maximum radius 232 as measured from the longitudinal axis. The maximum radius of the plurality of fins may be one half of a burnishing diameter 234. The fins may have any appropriate shape along their length 230. In the embodiment shown in FIG. 4, each fin has an arched radial outer surface 236 when viewed normal to a side face 238 of the fin. In other embodiments, the fins may extend azimuthally around the longitudinal axis as well as radially and longitudinally.

The cutting portion 208 of the tool may have a cutting or machining radius 240. In cases where the cutting portion has a plurality of machining or cutting sections disposed along the tool body 202, each with a respective diameter or equivalent machining or cutting radius, machining radius 240 may be a largest machining or cutting radius. In the embodiment shown in FIG. 4, the maximum radius 232 of the plurality of fins 229 is greater than the cutting radius 240. Additionally, as shown, there is a gap between cutting portion 208 and burnishing portion 210 having a reduced radius less than the largest machining or cutting radius and correspondingly less than the maximum radius of the burnishing portion. In other embodiments, the maximum radius of the fins may be substantially the same as the cutting radius or less than the cutting radius. The difference between the maximum radius 232 of the fins and the largest machining radius 240 of the cutting portion may be exaggerated in the view of FIG. 4 for ease of viewing.

As the blunt radial outer surfaces 228 of the burnishing elements may be a curved convex surface, the blunt radial outer surfaces may make tangential or nearly tangential contact with the side wall 224 of the hole 214. As the burnishing elements move along the side wall of the hole, the blunt radial outer surfaces 228 of the fins may deform the side walls of the hole without removing material from the workpiece, thereby inducing a beneficial residual stress in the side wall of the hole. In other embodiments, the burnishing elements may include a sharp burnishing edge directed away from the direction of edge travel instead of a blunt or rounded edge. In these other embodiments the angle of contact between the burnishing elements and the side walls of the hole may be small enough so that the burnishing elements deform the side walls without removing material.

Example 4

This example describes another illustrative embodiment of a combination cutting and burnishing orbital drilling tool. The combination cutting and burnishing orbital drilling tool may be referred to as a cutting tool, see FIG. 5.

Figure 5:
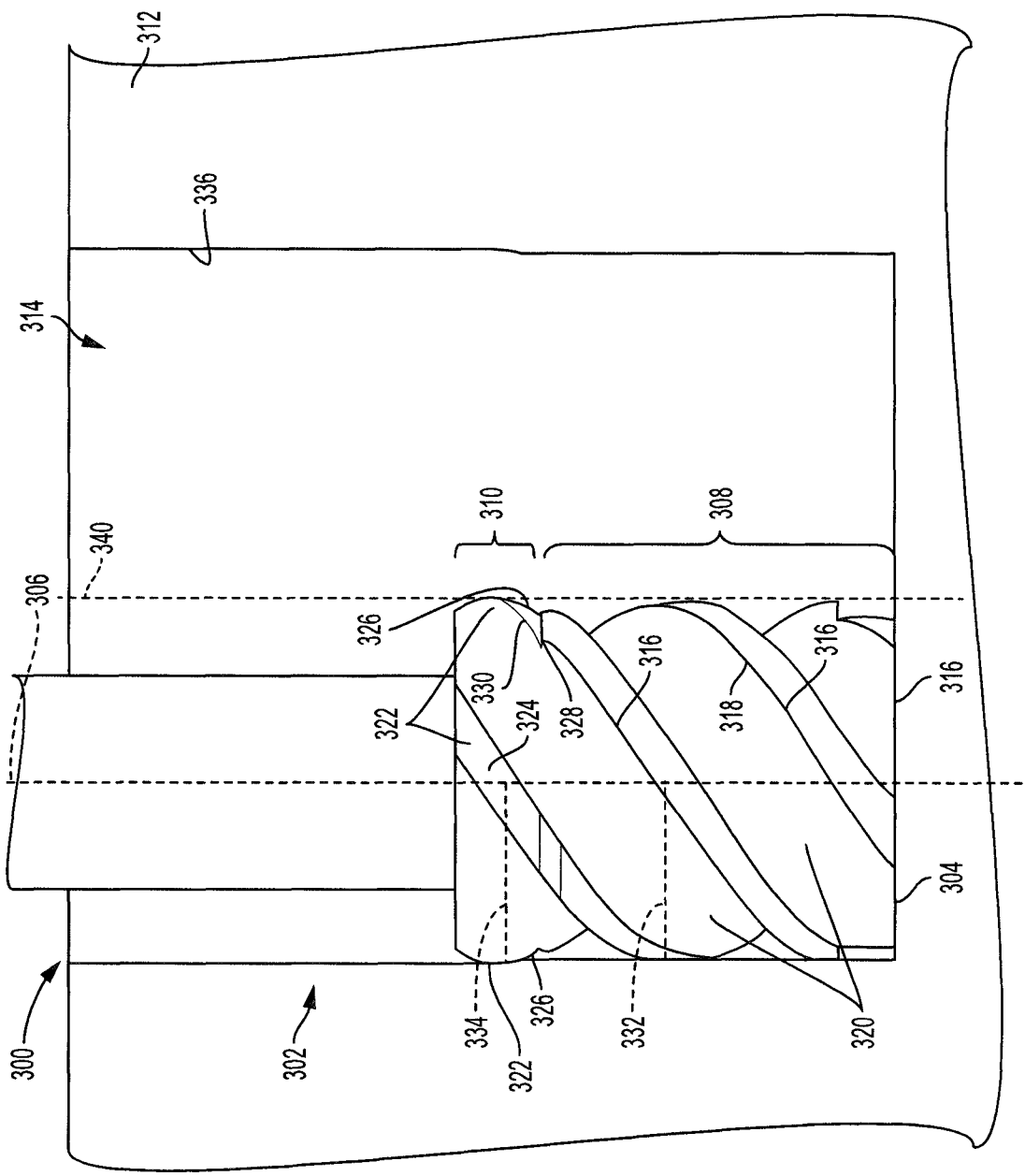
FIG. 5 is a side view depicting another embodiment of a combination cutting and burnishing orbital drilling tool, shown during a cutting process.

FIG. 5 is a side view depicting an embodiment of a combination cutting and burnishing orbital drilling tool, generally indicated at 300, shown during a cutting process. Cutting tool 300 may be similar to cutting tool 100 or cutting tool 10.

Cutting tool 300 may include an elongate tool body 302 having a cutting or machining end 304 and extending along a longitudinal axis 306. Tool body 302 may include a cutting or machining portion 308 and a burnishing portion 310. The burnishing portion 310 may be spaced from the cutting end and the cutting portion 308 may be disposed between the cutting end and the burnishing portion.

The cutting portion 308 of the combination cutting and burnishing orbital drilling tool 300 may be configured to remove material from a workpiece 312, thereby creating a hole 314. The cutting portion may include at least one cutting edge 316 disposed on the tool body 302. A cutting edge 316 may extend along the cutting end 304 and extend from the cutting end along the longitudinal axis 306 in a cutting helix 318. The cutting portion 308 of cutting tool 300 may function in a similar fashion as the cutting portion 208 of cutting tool 200 in regard to removing material from the workpiece 312. Cutting tool 300 may include a plurality of cutting flutes 320 configured to direct removed material away from the cutting edges 316.

The burnishing portion 310 may include a plurality of burnishing elements 322 extending longitudinally along the tool body 302. Each of the plurality of burnishing elements may have a blunt radially outer surface 324 disposed for contacting the workpiece sequentially during rotation of the drilling tool. That is, the blunt radial outer surface 324 may be a curved convex surface as viewed in a plane perpendicular to the longitudinal axis 306.

In the embodiment shown in FIG. 5, the plurality of burnishing elements are a plurality of blunt edges 326 with each blunt edge 326 associated with a respective cutting edge 316. That is, each cutting edge 316 may extend along a cutting helix 318 from proximate the cutting end 304 to a cutting edge terminus 328. Each blunt edge 326 may extend in a blunt helix 330 substantially continuing the cutting helix 318 of the associated cutting edge 316. At the cutting edge terminus there may be a transition from the sharp cutting edge 316 to the blunt edge 326 while substantially continuing the spiraling form of the helix along the longitudinal axis 306.

The cutting portion 308 of the tool may have a cutting or machining radius 332. In cases where the cutting portion has a plurality of machining or cutting sections of different machining or cutting diameters, or equivalently a plurality of different machining or cutting radii, machining radius 332 may be a largest machining or cutting radius. In the embodiment shown in FIG. 5, a maximum radius 334 of the burnishing portion 310 is greater than the cutting radius 332. Additionally, as shown, there is a gap between machining portion 308 and burnishing portion 310 having a reduced radius that is less than the largest machining or cutting radius and correspondingly less than the maximum radius of the burnishing portion. In other embodiments, the maximum radius of the burnishing portion may be substantially the same as the cutting radius or less than the cutting radius. The difference between the maximum radius 334 of the burnishing portion and the largest machining radius 332 of the cutting portion may be exaggerated in the view of FIG. 5 for ease of viewing.

During a burnishing process, the combination cutting and burnishing orbital drilling tool 300 may rotate around the longitudinal axis 306 as the cutting tool 300 moves along a hole axis 340 and in contact with a side wall 336 of the hole 314. Thus, the plurality of blunt edges 326 may make contact with the workpiece 312 sequentially as the cutting tool rotates. The blunt radial outer surfaces 324 of the blunt edges may deform the side walls of the hole without removing material from the workpiece, thereby inducing a beneficial residual stress in the side wall of the hole.

Example 5

Figure 6:
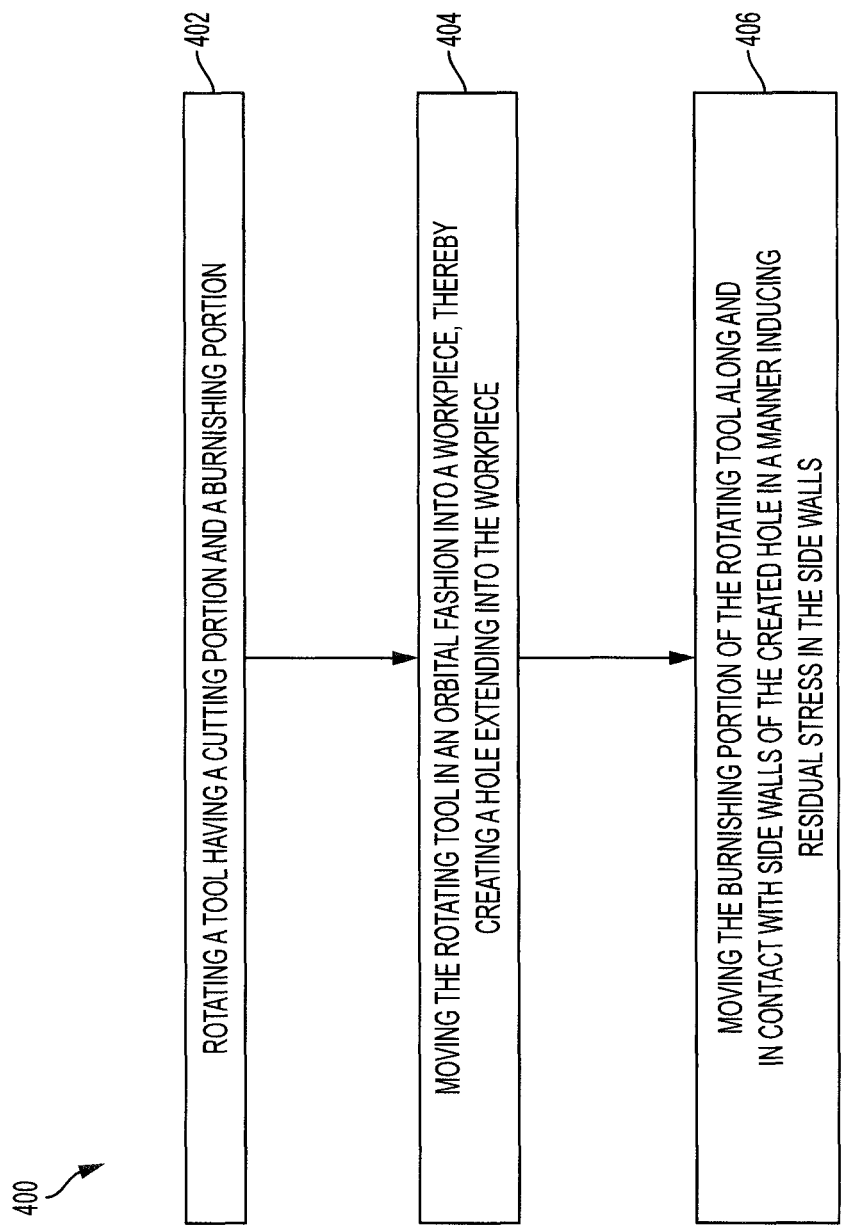
FIG. 6 is a flow chart depicting a method of producing a hole in a workpiece.

This example describes an illustrative method of producing a hole in a workpiece, which may be used in conjunction with any of the cutting tools described herein; see FIG. 6. Various steps of the method are illustrated schematically in FIGS. 7-11 and these figures will be referred to along with the steps outlined in FIG. 6.

FIG. 6 depicts multiple steps of a method, generally indicated at 400 of producing a hole in a workpiece. Method 400 may be used in conjunction with any of the combination cutting and burnishing orbital drilling tools depicted in and described in reference to FIGS. 1-5. In particular, an exemplary implementation of method 400 is depicted in FIGS. 7-11, though other implementations are also possible. Although various steps of method 400 are described below and depicted in FIG. 6, the steps need not necessarily all be performed, in some cases may be performed in a different order than the order shown, and in some cases may be performed simultaneously.

Method 400 includes a step 402 of rotating a tool having a cutting portion and a burnishing portion. The tool may have a cutting end and may extend along a longitudinal axis. The burnishing portion may be spaced from the cutting end and the cutting portion may be interposed between the cutting end and the burnishing portion. Rotating the tool may include rotating the tool about the longitudinal axis. The tool may be rotated by an orbital drill to which the tool has been coupled.

Rotating the tool may include rotating the tool with the cutting portion having a maximum cutting diameter and the burnishing portion having a burnishing diameter that is greater than the maximum cutting diameter. Further, rotating the tool may include rotating the tool having a tool shaft disposed along the longitudinal axis with the burnishing portion interposed between the tool shaft and the cutting portion.

Figure 7:
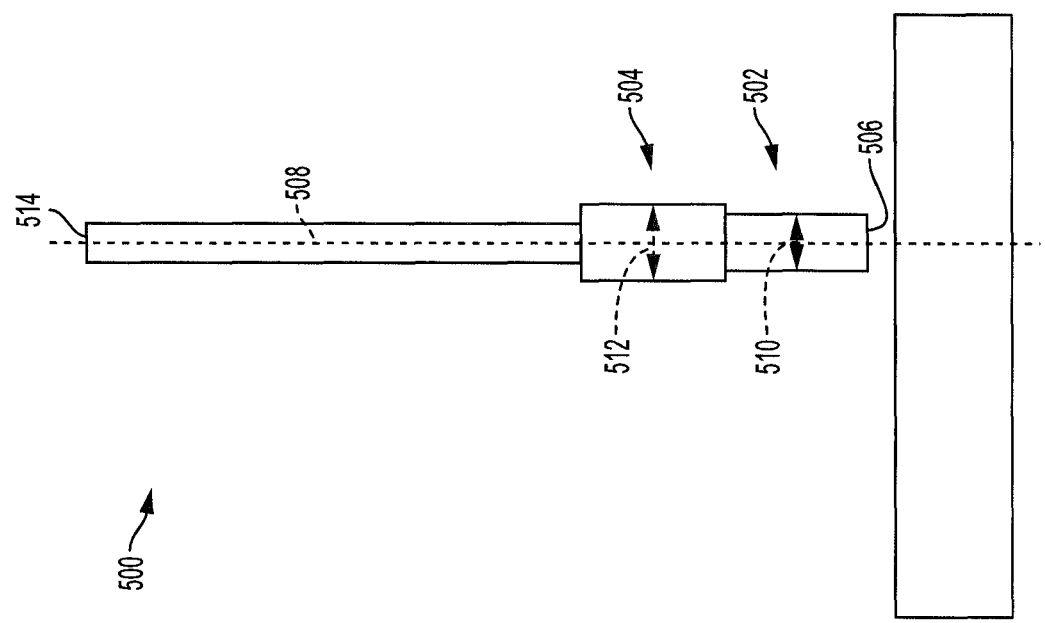
FIGS. 7-11 schematically depict a combination cutting and burnishing orbital drilling tool at various stages of creating a hole in a workpiece.

For example, in FIG. 7 a tool, generally indicated at 500 is shown. Tool 500 includes a cutting portion 502, a burnishing portion 504, and a cutting end 506, and extends along a longitudinal axis 508 as described above. The cutting portion 502 of tool 500 has a maximum cutting diameter 510 and the burnishing portion 504 has a burnishing diameter 512 greater than the maximum cutting diameter. The tool 500 may have a drill end 514 which may be coupled to an orbital drill (not shown). The tool may be configured to rotate or spin around the longitudinal axis 508 and the longitudinal axis may be configured to move in one or more directions perpendicular to the longitudinal axis.

Method 400 includes a step 404 of moving the rotating tool in an orbital fashion into a workpiece, thereby creating a hole extending into the workpiece. Moving the rotating tool in an orbital fashion may include moving the longitudinal axis of the tool around and along a hole axis. The created hole may have a side wall or side walls and may extend along the hole axis into the workpiece. It may be appropriate to move the rotating tool in an orbital fashion into a workpiece made of a single material, such as aluminum, titanium, or steel, or into a workpiece made of more than one material, such as a carbon-fiber-reinforced polymer or some other layered workpiece.

Moving the rotating tool in an orbital fashion may include moving the rotating tool so that the longitudinal axis is a first distance from the hole axis and creating a hole having a first diameter.

Figure 8:
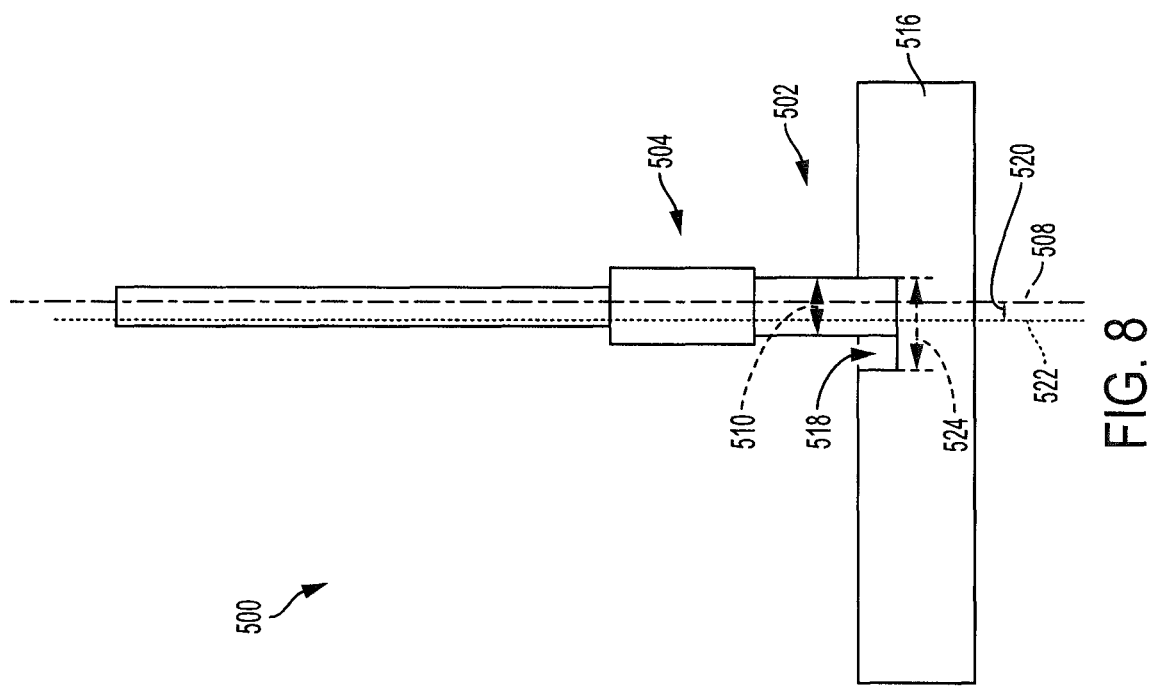

FIG. 8 depicts a snapshot of an exemplary implementation of step 404 where tool 500 is moving in an orbital fashion into a workpiece 516. The cutting portion 502 has removed material from the workpiece, and thereby created a hole 518. The burnishing portion 504 has not yet come into contact with the workpiece. The longitudinal axis 508 may be disposed a first distance 520 from a hole axis 522. Tool 500 may move so that the longitudinal axis 508 rotates or orbits around the hole axis 522 so that the longitudinal axis and the hole axis maintain a separation of the first distance 520 as the tool moves. At this stage the hole 518 may have a first diameter 524 which may be determined by the first distance 520 and the maximum cutting diameter 510 of the cutting portion. In addition to moving around the hole axis, the tool may move deeper into the workpiece along the hole axis.

Moving the rotating tool in an orbital fashion into a workpiece may include moving the rotating tool in an orbital fashion into a workpiece having a thickness less than a distance between the cutting end of the rotating tool and a leading edge of the burnishing portion of the rotating tool. The cutting portion of the tool has a cutting length measured along the longitudinal axis and the cutting length may be greater than the thickness of the workpiece. The cutting length may be equal to or greater than the distance between the cutting end and a leading edge of the burnishing portion. However, for example in instances where there is space between the cutting portion of the tool and the leading edge of the burnishing portion, the cutting length may be different from the distance between the cutting end and a leading edge of the burnishing portion.

Figure 9:
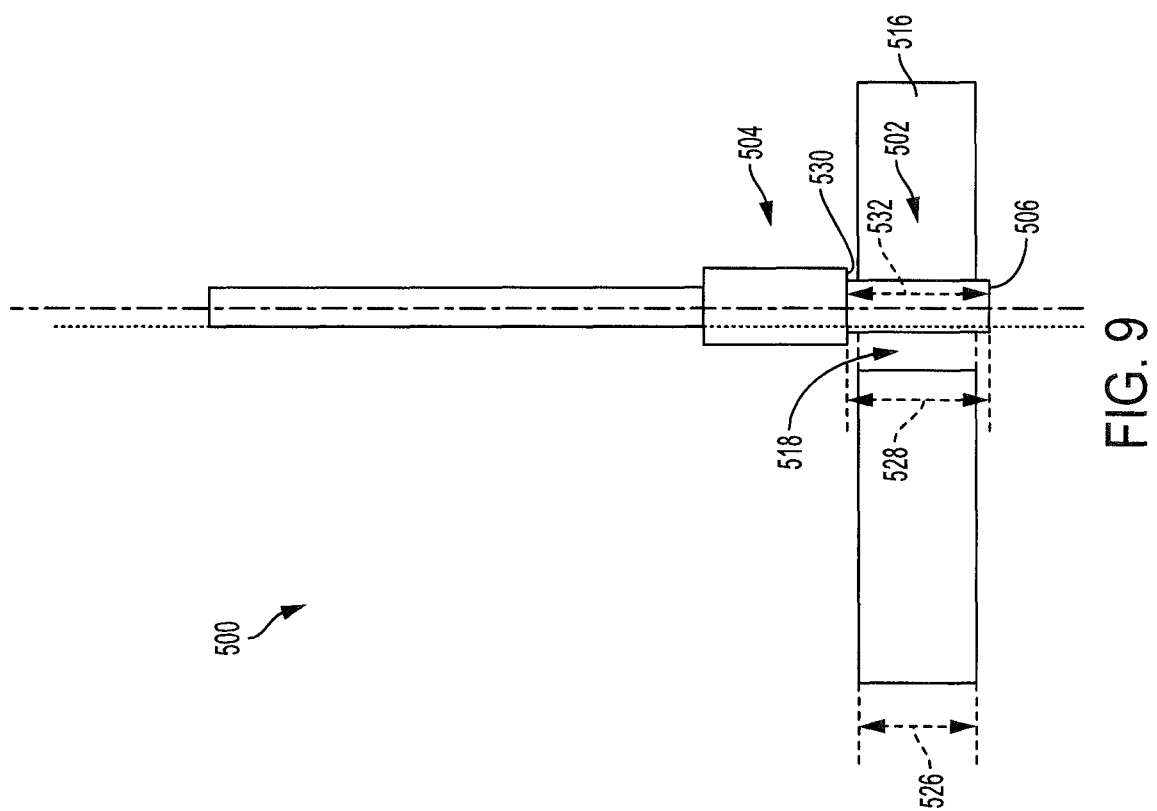

FIG. 9 depicts a snapshot of an exemplary implementation of step 404 where the cutting portion 502 of tool 500 has completely cut through the workpiece 516. Hole 518 is now a passage through the workpiece. The burnishing portion 504 has not yet come into contact with the workpiece. Workpiece 516 may have a thickness 526 less than a distance 528 between the cutting end 506 of the rotating tool and a leading edge 530 of the burnishing portion. The cutting portion 502 of exemplary tool 500 may have a cutting length 532 measured along the longitudinal axis 508. Cutting length 532 may be greater than the thickness 526 of the workpiece.

Note that the cutting length of the cutting portion need not be greater than the thickness of the workpiece. For example, in the exemplary embodiments shown in FIG. 4 and FIG. 5, the cutting length of the cutting portion is less than the thickness of the workpiece. The embodiments shown in FIGS. 4 and 5 have a burnishing diameter that is greater than a maximum cutting diameter. In these cases, the burnishing portion of the tool may begin burnishing the side walls of the hole before the cutting portion of the tool has completed creating the hole. Optionally, there may be a distance between the cutting portion and the burnishing portion that allows drilling holes through workpieces that are thicker than the length of the cutting portion.

Method 400 includes a step 406 of moving the burnishing portion of the rotating tool along and in contact with the side walls of the created hole in a manner inducing residual stress in the side walls. That is, the burnishing portion of the rotating tool may move within the hole around the hole axis and along the hole axis so that the burnishing portion makes contact with the side walls as the tool moves. The contact between the burnishing portion and the side walls may be a sliding contact as the tool rotates. This contact may deform the surface of the side walls of the hole without removing material from the workpiece.

Moving the burnishing portion of the rotating tool along and in contact with the side walls of the created hole may include moving the burnishing portion so that the longitudinal axis is the first distance from the hole axis, thereby increasing the diameter of the created hole to a second diameter larger than the first diameter. That is, the separation between the longitudinal axis and the hole axis that was present during step 404, when the cutting portion was removing material from the workpiece, may be maintained even as the burnishing portion is in contact with the side walls of the hole. As the burnishing diameter may be greater than the maximum cutting diameter, maintaining this separation may increase the diameter of the hole by deforming the side walls of the hole without removing material.

Figure 10:
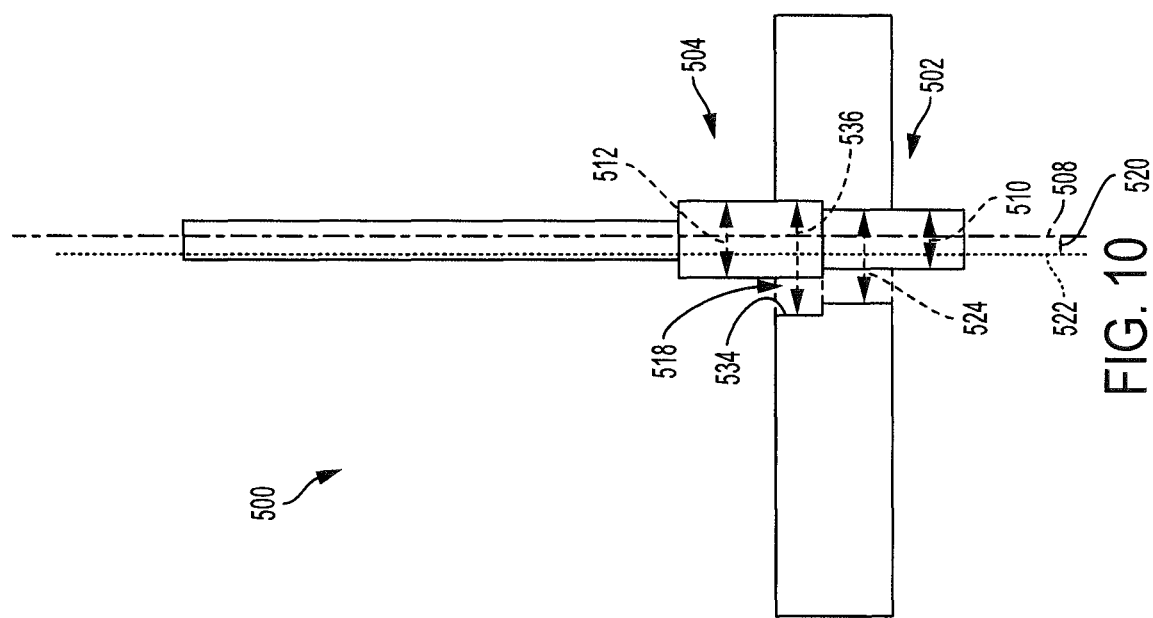

FIG. 10 depicts a snapshot of an exemplary implementation of step 406 where the burnishing portion 504 has begun to induce residual stress in side walls 534 of the hole 518. The longitudinal axis 508 may be disposed the first distance 520 from the hole axis 522, that is, the same distance as is depicted in FIG. 8. As the larger burnishing diameter 512 makes contact with the side walls of the hole, and the relative disposition of the longitudinal and hole axes is maintained, the hole diameter may increase from the first diameter 524 to a second diameter 536 larger than the first diameter. The difference between the second diameter and the first diameter may be exaggerated in FIG. 10 for ease of viewing.

Moving the burnishing portion of the rotating tool along and in contact with the side walls of the created hole may include moving the rotating tool with the cutting portion extending beyond the created hole on a first side of the workpiece and a portion of the tool shaft extending beyond the created hole on a second side of the workpiece, the second side opposite the first side.

Figure 11:
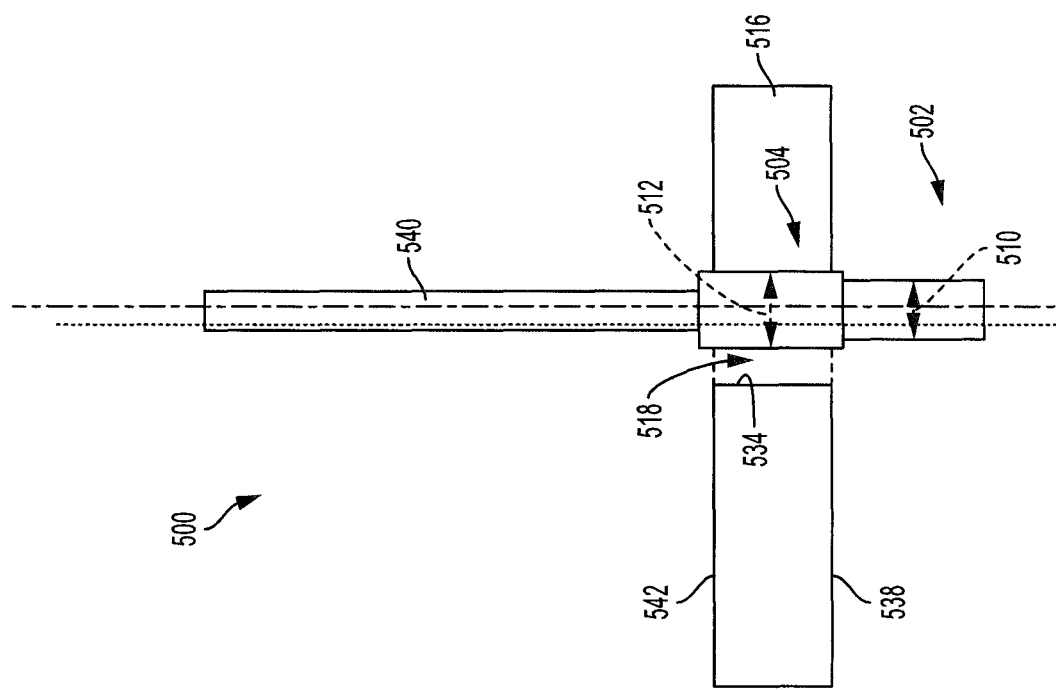

FIG. 11 depicts a snapshot of an exemplary implementation of step 406 where the cutting portion 502 extends beyond the created hole 518 on a first side 538 of the workpiece 516 and a portion of a tool shaft 540 extends beyond the created hole on a second side 542 of the workpiece, the second side opposite the first side.

Example 6

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A combination cutting and burnishing orbital drilling tool, comprising:
an elongate tool body including a cutting end and extending along a longitudinal axis;
wherein the tool body includes
a burnishing portion spaced from the cutting end and being configured to induce residual stress in a side wall of a hole without removing material; and
a cutting portion interposed between the cutting end and the burnishing portion, the cutting portion configured to remove material from a workpiece, thereby creating the hole, during an orbital drilling process.

A2. The combination cutting and burnishing orbital drilling tool of paragraph A1, wherein the cutting portion includes a plurality of cutting diameters beginning with a first cutting diameter proximate the cutting end, with each subsequent cutting diameter greater than the previous cutting diameter.

A3. The combination cutting and burnishing orbital drilling tool of paragraph A1, wherein the tool body includes a tool shaft disposed along the longitudinal axis with the burnishing portion interposed between the tool shaft and the cutting portion, the tool shaft has a shaft diameter, and the burnishing portion has a burnishing diameter that is greater than the shaft diameter.

A4. The combination cutting and burnishing orbital drilling tool of paragraph A3, wherein the cutting portion of the tool has a maximum cutting diameter and the burnishing diameter is greater than the maximum cutting diameter.

A5. The combination cutting and burnishing orbital drilling tool of paragraph A1, wherein the burnishing portion includes a plurality of fins extending radially from the tool body and having a length extending along the longitudinal axis, the plurality of fins being distributed circumferentially around the tool body.

A6. The combination cutting and burnishing orbital drilling tool of paragraph A5, wherein each of the plurality of fins extends to a maximum radius as measured from the longitudinal axis, the cutting portion of the tool has a cutting radius, and the maximum radius of the plurality of fins is greater than the cutting radius.

A7. The combination cutting and burnishing orbital drilling tool of paragraph A6, wherein each fin has an arched radial outer surface when viewed normal to a side face of the fin.

A8. The combination cutting and burnishing orbital drilling tool of paragraph A1, wherein the cutting portion includes at least one cutting edge, each cutting edge disposed on the tool body and extending from the cutting end along the longitudinal axis in a cutting helix; and the burnishing portion includes a blunt edge associated with each cutting edge, each blunt edge extending in a blunt helix substantially continuing the cutting helix of the associated cutting edge.

A9. The combination cutting and burnishing orbital drilling tool of paragraph A1, wherein the burnishing portion includes a plurality of burnishing elements extending longitudinally along the tool body and having a blunt radial outer surface disposed for contacting the workpiece sequentially during rotation of the drilling tool.

B1. A cutting tool having a body, the cutting tool comprising:
a machining portion including a plurality of machining diameters beginning with a first machining diameter proximate a machining end of the tool, with each subsequent machining diameter greater than the previous machining diameter; and
a burnishing portion having a burnishing diameter greater than the maximum of the plurality of machining diameters.

B2. The cutting tool of paragraph B1, wherein the machining portion is configured to create a hole in a workpiece during an orbital drilling process and the burnishing portion is configured to induce residual stress in a side wall of the hole without removing material.

B3. The cutting tool of paragraph B1, wherein the body of the cutting tool is disposed along a longitudinal axis and the machining portion is interposed between the machining end of the tool and the burnishing portion.

B4. The cutting tool of paragraph B3, wherein the burnishing portion includes a plurality of fins extending from the body in a direction away from the longitudinal axis and extending along the longitudinal axis.

B5. The cutting tool of paragraph B4, wherein each of the plurality of fins extends to a maximum radius as measured from the longitudinal axis, and the maximum radius of the plurality of fins is one half of the burnishing diameter.

B6. The cutting tool of paragraph B3, wherein the machining portion includes at least one machining edge, each machining edge disposed on the tool body and extending from the machining end along the longitudinal axis in a machining helix; and the burnishing portion includes a blunt edge associated with each machining edge, each blunt edge extending in a blunt helix substantially continuing the machining helix of the associated machining edge.

C1. A method of producing a hole in a workpiece, the method comprising:
rotating a tool having a cutting end and extending along a longitudinal axis, the tool having a burnishing portion spaced from the cutting end and a cutting portion interposed between the cutting end and the burnishing portion;
moving the rotating tool in an orbital fashion into a workpiece, wherein the longitudinal axis of the tool moves around and along a hole axis, thereby creating a hole having side walls and extending along the hole axis into the workpiece; and
moving the burnishing portion of the rotating tool along and in contact with the side walls of the created hole in a manner inducing residual stress in the side walls of the hole.

C2. The method of paragraph C1, wherein moving the burnishing portion of the rotating tool along and in contact with the side walls of the created hole includes moving the burnishing portion of the rotating tool along and in contact with the side walls of the created hole without removing material from the workpiece.

C3. The method of paragraph C1, wherein moving the burnishing portion of the rotating tool along and in contact with the side walls of the created hole includes tilting the rotating tool relative to the side walls with the longitudinal axis transverse to the hole axis.

C4. The method of paragraph C1, wherein moving the rotating tool in an orbital fashion into a workpiece includes moving the rotating tool in an orbital fashion into an aluminum workpiece.

C5. The method of paragraph C1, wherein rotating the tool includes rotating the tool with the cutting portion having a maximum cutting diameter and the burnishing portion having a burnishing diameter that is greater than the maximum cutting diameter, moving the rotating tool in an orbital fashion includes moving the rotating tool so that the longitudinal axis is a first distance from the hole axis and the created hole has a first diameter, and moving the burnishing portion of the rotating tool along and in contact with the side walls of the created hole includes moving the burnishing portion so that the longitudinal axis is the first distance from the hole axis, thereby increasing the diameter of the created hole to a second diameter larger than the first diameter.

C6. The method of paragraph C1, wherein rotating a tool includes rotating a tool having a tool shaft disposed along the longitudinal axis with the burnishing portion interposed between the tool shaft and the cutting portion, and moving the burnishing portion of the rotating tool along and in contact with the side walls of the created hole includes moving the rotating tool with the cutting portion extending beyond the created hole on a first side of the workpiece and a portion of the tool shaft extending beyond the created hole on a second side of the workpiece, the second side opposite the first side.

C7. The method of paragraph C1, wherein moving the rotating tool in an orbital fashion into a workpiece includes moving the rotating tool in an orbital fashion into a workpiece having a thickness less than a distance between the cutting end of the rotating tool and a leading edge of the burnishing portion of the rotating tool.

C8. The method of paragraph C7, wherein the cutting portion has a cutting length measured along the longitudinal axis and the cutting length is greater than the thickness of the workpiece.

Advantages, Features, Benefits

The different embodiments of the combination cutting and burnishing orbital drilling tools and methods of use thereof described herein provide several advantages over known solutions for orbital drilling. For example, the illustrative embodiments of combination cutting and burnishing orbital drilling tools described herein allow a hole to be drilled into a workpiece and subsequently burnished using only one tool. Additionally, and among other benefits, illustrative embodiments of the cutting tools described herein may be particularly suitable for use in drilling holes in aluminum. No known system or device can perform these functions, particularly with one pass of a single tool. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A combination cutting and burnishing orbital drilling tool, comprising:
    an elongate tool body including a cutting end having radially extending cutting edges, the elongate tool body extending along a longitudinal axis;
    wherein the tool body includes
        a burnishing portion spaced from the cutting end and being configured to induce residual stress in a side wall of a hole without removing material; and
        a plurality of helical cutting edges interposed between the cutting end and the burnishing portion, each of the plurality of helical cutting edges extending circumferentially around and along the longitudinal axis of the tool body in a cutting helix, the plurality of helical cutting edges being configured to remove material from a workpiece, thereby creating the hole, during an orbital drilling process;
    wherein the plurality of helical cutting edges have in combination a maximum cutting radius that is located at a first longitudinal position on the longitudinal axis, and the burnishing portion has a burnishing radius that is located at a second longitudinal position on the longitudinal axis and that is greater than the maximum cutting radius.

2. The combination cutting and burnishing orbital drilling tool of claim 1, wherein the cutting end has a first cutting radius and the maximum cutting radius of the plurality of helical cutting edges is greater than the first cutting radius.

3. The combination cutting and burnishing orbital drilling tool of claim 1, wherein the tool body includes a tool shaft disposed along the longitudinal axis with the burnishing portion interposed between the tool shaft and the plurality of helical cutting edges, the tool shaft has a shaft radius, and the burnishing radius is greater than the shaft radius.

4. The combination cutting and burnishing orbital drilling tool of claim 1, wherein the burnishing portion includes a plurality of fins extending radially from the tool body with planar major faces that are parallel to the longitudinal axis, and the plurality of fins are distributed at respective spaced-apart circumferential positions around the tool body.

5. The combination cutting and burnishing orbital drilling tool of claim 4, wherein each of the plurality of fins has a length extending along the longitudinal axis and extends along the length of the fin in a respective plane containing the longitudinal axis.

6. The combination cutting and burnishing orbital drilling tool of claim 5, wherein each fin has an arched outer surface along the length of the fin when the fin is viewed normal to one of the major faces of the fin.

7. The combination cutting and burnishing orbital drilling tool of claim 4, wherein each of the plurality of fins extends to the burnishing radius.

8. The combination cutting and burnishing orbital drilling tool of claim 1, wherein the burnishing portion includes a blunt edge associated with each of the plurality of helical cutting edges, each blunt edge extending in a blunt helix substantially continuing the cutting helix of the associated cutting edge.

9. The combination cutting and burnishing orbital drilling tool of claim 1, wherein the burnishing portion includes a plurality of elongate burnishing elements extending lengthwise longitudinally along the tool body along respective lines that are parallel to the longitudinal axis and having blunt radial outer surfaces disposed for contacting the workpiece sequentially during rotation of the drilling tool.

10. The combination cutting and burnishing orbital drilling tool of claim 1, wherein the burnishing portion is axially spaced from the cutting portion by a gap region that is disposed between the first longitudinal position on the longitudinal axis of the maximum cutting radius and the second longitudinal position on the longitudinal axis of the burnishing radius, the gap region has a radial dimension that is less than the maximum cutting radius, and the gap extends circumferentially completely around the longitudinal axis at a third longitudinal position on the longitudinal axis between the first and second longitudinal positions.

11. A cutting tool comprising:
a tool body extending along a longitudinal axis;
a machining portion including a plurality of machining radiuses beginning with a first machining radius proximate a machining end of the tool, with each subsequent machining radius greater than the previous machining radius, the machining portion including a plurality of helical machining edges disposed on the tool body and extending along and around the longitudinal axis distal of the machining end in respective machining helixes having in combination a maximum machining radius that is located at a first longitudinal position on the longitudinal axis and that is greater than the other machining radiuses of the plurality of machining radiuses, including the first machining radius; and
a burnishing portion adjacent to the machining portion distal of the machining end and having a burnishing radius that is located at a second longitudinal position on the longitudinal axis that is greater than the maximum machining radius.

12. The cutting tool of claim 11, wherein the machining portion is configured to create a hole in a workpiece during an orbital drilling process and the burnishing portion is configured to induce residual stress in a side wall of the hole without removing material.

13. The cutting tool of claim 11, wherein the machining portion is interposed between the machining end of the tool and the burnishing portion, the burnishing portion is axially spaced from the machining portion by a circumferentially extending gap region disposed between the first longitudinal position on the longitudinal axis of the maximum machining radius and a and the second longitudinal position on the longitudinal axis of the burnishing portion having the burnishing radius, and the gap region has a radial dimension that is less than the maximum radial dimension of the machining portion and extends circumferentially completely around the longitudinal axis at a third longitudinal position that is located on the longitudinal axis between the first and second longitudinal positions.

14. The cutting tool of claim 11, wherein the burnishing portion includes a plurality of planar fins extending from the body in directions radially away from the longitudinal axis, and the fins have planar major faces that are parallel to the longitudinal axis.

15. The cutting tool of claim 14, wherein each of the plurality of fins extends to the burnishing radius.

16. The cutting tool of claim 14, wherein each of the plurality of fins has a length extending along the longitudinal axis and extends along the length of the fin in a respective plane containing the longitudinal axis.

17. The cutting tool of claim 16, wherein each fin has an arched outer surface along the length of the fin when the fin is viewed normal to one of the major faces of the fin.

18. The cutting tool of claim 11, wherein the burnishing portion includes a blunt edge associated with each helical machining edge, each blunt edge extending in a blunt helix substantially continuing the machining helix of the associated helical machining edge.

19. The cutting tool of claim 11, wherein the tool body includes a tool shaft disposed along the longitudinal axis with the burnishing portion interposed between the tool shaft and the plurality of helical machining edges, the tool shaft has a shaft radius, and the burnishing radius is greater than the shaft radius.

20. The cutting tool of claim 11, wherein the burnishing portion includes a plurality of elongate burnishing elements extending lengthwise longitudinally along the tool body along respective lines that are parallel to the longitudinal axis and having blunt radial outer surfaces disposed for contacting a workpiece sequentially during rotation of the cutting tool.

* * * * *